(12) United States Patent
Shimada et al.

(10) Patent No.: US 7,938,978 B2
(45) Date of Patent: May 10, 2011

(54) METHOD OF MANUFACTURING STAMPER

(75) Inventors: Takuya Shimada, Kawasaki (JP);
Shinobu Sugimura, Yokohama (JP);
Yoshiyuki Kamata, Tokyo (JP);
Masatoshi Sakurai, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/691,491

(22) Filed: Jan. 21, 2010

(65) Prior Publication Data
US 2010/0186877 A1    Jul. 29, 2010

(30) Foreign Application Priority Data
Jan. 23, 2009   (JP) .................... 2009-013472

(51) Int. Cl.
*B44C 1/22*    (2006.01)
*B28B 11/08*   (2006.01)

(52) U.S. Cl. ............ 216/83; 216/11; 264/220; 264/293

(58) Field of Classification Search ............... 216/11, 216/83; 264/220, 293
See application file for complete search history.

(56) References Cited

U.S. PATENT DOCUMENTS

| | | | |
|---|---|---|---|
| 7,154,843 B2 | 12/2006 | Nakano et al. | |
| 7,442,316 B2 * | 10/2008 | Jeong et al. | 216/11 |
| 2007/0018362 A1 * | 1/2007 | Heidari et al. | 264/496 |
| 2007/0158872 A1 * | 7/2007 | Jeong et al. | 264/220 |
| 2008/0128944 A1 * | 6/2008 | Wang et al. | 264/293 |
| 2008/0131548 A1 * | 6/2008 | Gauzner et al. | 425/175 |

FOREIGN PATENT DOCUMENTS

| | | |
|---|---|---|
| JP | 05-144093 | 6/1993 |
| JP | 10-121237 A | 5/1998 |
| JP | 10-312585 | 11/1998 |
| JP | 2003-077807 A | 3/2003 |
| JP | 2006-277868 A | 10/2006 |
| JP | 2007-095116 A | 4/2007 |
| JP | 2008-012705 | 1/2008 |
| JP | 2008-254413 A | 10/2008 |

OTHER PUBLICATIONS

Notice of Reason for Rejection mailed by Japan Patent Office on Mar. 30, 2010 in the corresponding Japanese patent application No. 2009-013472.

Notice of Reason for Rejection mailed by Japan Patent Office on Jun. 15, 2010 in the corresponding Japanese patent application No. 2009-013472.

\* cited by examiner

*Primary Examiner* — Shamim Ahmed
(74) *Attorney, Agent, or Firm* — Knobbe, Martens, Olson & Bear LLP

(57) ABSTRACT

According to one embodiment, a method of manufacturing a stamper includes forming a first stamper from a master plate having lands and grooves through electroforming, forming a second stamper, a width of which is $G_W$, from the first stamper through electroforming, forming a lamination film with a thickness of $LL_T$ on the second stamper, forming, on the lamination film, a second releasing layer, a transfer layer with a thickness of $TL_T$ and a third electroforming layer with a thickness of $EL_T$, peeling off the transfer layer and the third electroforming layer from the second stamper to form a third stamper, and isotropically etching the transfer layer on the third stamper in an etching thickness of $E_T$ to reduce a width of lands of the third stamper, in which the following relations are satisfied: $10\ \text{nm} \leq EL_T$ and $E_T \leq TL_T$.

6 Claims, 3 Drawing Sheets

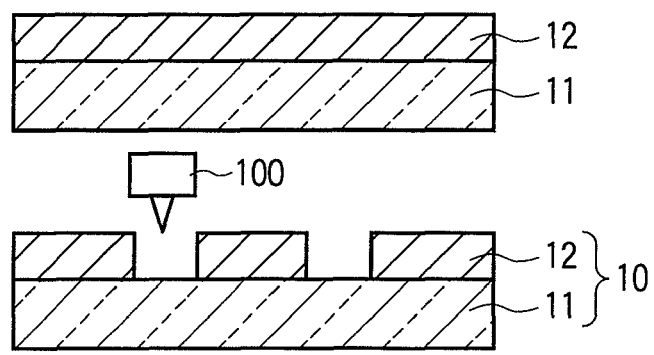
FIG. 1A
FIG. 1B
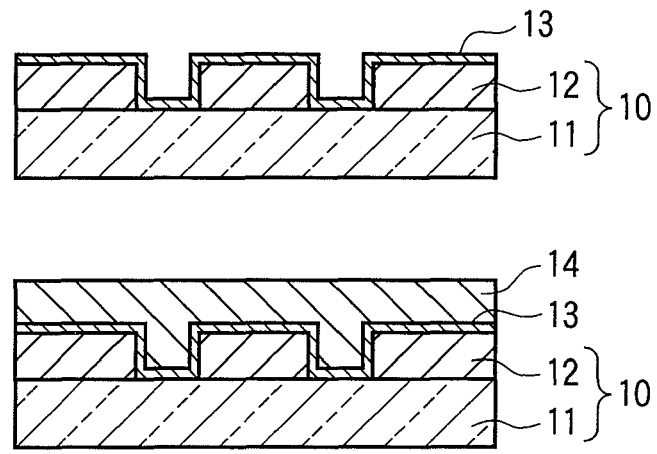
FIG. 1C
FIG. 1D
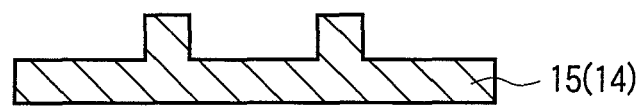
FIG. 1E
FIG. 1F
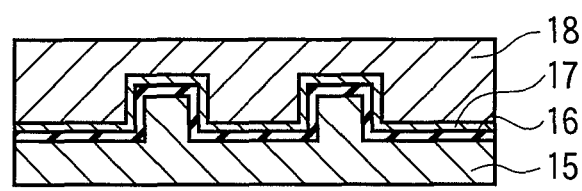
FIG. 1G
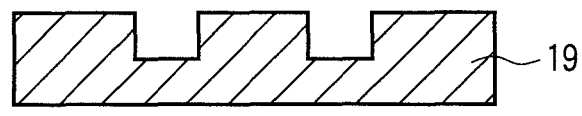
FIG. 1H

METHOD OF MANUFACTURING STAMPER

CROSS-REFERENCE TO RELATED APPLICATIONS

This application is based upon and claims the benefit of priority from Japanese Patent Application No. 2009-013472, filed Jan. 23, 2009, the entire contents of which are incorporated herein by reference.

BACKGROUND

1. Field

One embodiment of the present invention relates to a method of manufacturing a stamper used for mass production of magnetic recording media by transferring patterns by an imprint technique.

2. Description of the Related Art

In recent years, there has been known a problem that improvement in track density is hindered by interference between adjacent tracks in a magnetic recording medium to be installed in a hard disk drive (HDD). In particular, it is an important technological problem to reduce fringing of a write head field.

To address the problem, a discrete track recording medium (DTR medium) has been developed in which recording tracks are physically separated from each other. The DTR medium can reduce the side erase phenomenon that the information of an adjacent track is erased in a write operation and the side read phenomenon that the information of an adjacent track is read out in a read operation, leading to an improved track density. Therefore, the DTR medium is expected as a high-density magnetic recording medium.

For producing the DTR medium, a nano-imprint method using a nickel (Ni) stamper is employed as disclosed in Jpn. Pat. Appln. KOKAI Publication No. 2008-12705. First, a resist layer is formed on a substrate such as glass or Si, subjected to electron-beam (EB) lithography and developed to manufacture a master plate having patterns of lands and grooves. A Ni conductive layer is formed on the surface of the master plate and a Ni electroforming layer is formed on the Ni conductive layer, and the Ni conductive layer and Ni electroforming layer are peeled off to manufacture a father stamper. A mother stamper is likewise manufactured from the father stamper using a method in which a Ni conductive layer and a Ni electroforming layer are formed and then peeled off, and further, a son stamper is likewise formed from the mother stamper. Next, a magnetic recording layer is formed on a medium substrate and a resist is applied to the magnetic recording layer. The resist is imprinted with the son stamper to transfer patterns of lands and grooves of the son stamper to the resist. The magnetic recording layer is etched using the resist pattern as a mask to form a DTR medium.

In order to achieve high-density recording, it is required to form the patterns of lands and grooves at a track pitch of 100 nm or less. If it is intended to form the patterns of lands and grooves on the master plate at a high density, the time for electron beam lithography is prolonged. At this time, the electron beam writing performance is more improved with decrease in the thickness of the resist. Therefore, there is a tendency that the thickness of the resist is made smaller with increase in the density of the patterns of lands and grooves. As a result, the land height on the surface of the master plate is decreased and, accordingly, the land height on the surface of the stamper is decreased. However, if a stamper with a land low in height is used, the patters of lands and grooves transferred to the resist on the medium may have defects because of insufficient transfer during imprinting. Also, even if the track pitch is made small, it is necessary for the lands to have a width enough to maintain performance to read from and write to the track, i.e., the land. For this purpose, it is necessary to form grooves having a small width by EB lithography in the production of the master plate. It is however difficult to write grooves having a width of several nanometers because of the limitation of an EB writing apparatus. Therefore, current technologies have such a problem that a high-density master plate is not provided.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIGS. 1A to 1H are cross-sectional views showing a method of manufacturing a first stamper and a second stamper according to an embodiment of the present invention;

DETAILED DESCRIPTION

Figure 2A:
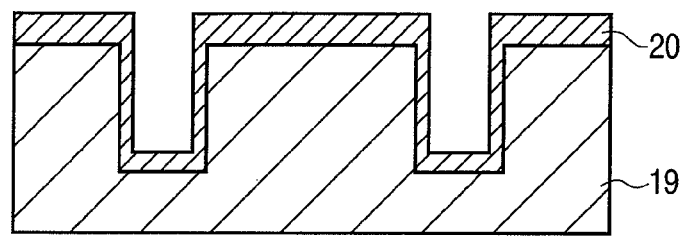
FIGS. 2A to 2E are cross-sectional views showing a method of manufacturing a third stamper according to an embodiment of the present invention.

Various embodiments according to the invention will be described hereinafter with reference to the accompanying drawings. In general, according to one embodiment of the invention, there is provided a method of manufacturing a stamper, comprising: forming a first conductive layer on a master plate having lands and grooves, forming a first electroforming layer on the first conductive layer and peeling off the first conductive layer and the first electroforming layer from the master plate to form a first stamper to which the lands and grooves of the master plate are transferred; forming a first releasing layer on the first stamper, forming a second conductive layer on the first releasing layer, forming a second electroforming layer on the second conductive layer and peeling off the second conductive layer and the second electroforming layer from the first stamper to form a second stamper to which the lands and grooves of the first stamper are transferred; forming a lamination film on the second stamper, in which the lamination film reduces a width of grooves and has a larger thickness on upper surfaces of the lands than on bottom surfaces of the grooves, forming a second releasing layer on the lamination film, forming a transfer layer on the second releasing layer, forming a third electroforming layer on the transfer layer, peeling off the transfer layer and the third electroforming layer from the second stamper to form a third stamper to which the lands and grooves of the second stamper are transferred, and isotropically etching the transfer layer on the third stamper to reduce a width of lands of the third stamper, wherein the following relations are satisfied: 10 nm$\leq$EL$_T$ and E$_T \leq$TL$_T$, where a width of the groove of the second stamper is G$_W$, a thickness of the lamination layer is LL$_T$, a thickness of the transfer layer is TL$_T$, a thickness of the third electroforming layer is EL$_T$, an etching thickness of the transfer layer is E$_T$ and a width of the land of the third stamper is L$_W$.

In the method of manufacturing a stamper according to an embodiment of the present invention, the patterns of lands and grooves of a master plate is transferred to form a first stamper, a second stamper and a third stamper.

First, a first conductive layer is formed on a master plate having patterns of lands and grooves, a first electroforming layer is formed on the first conductive layer, and then, the first conductive layer and first electroforming layer are peeled off from the master plate to form a first stamper to which the land and groove of the master plate are transferred.

Next, a first releasing layer is formed on the surface of the first stamper and a second conductive layer is formed on the first releasing layer, a second electroforming layer is formed on the second conductive layer, and then, the second conductive layer and second electroforming layer are peeled off from the first stamper to form a second stamper to which the lands and grooves of the first stamper are transferred.

Then, a lamination film is formed on the second stamper, in which the lamination film reduces a width of grooves and has a larger thickness on upper surfaces of the lands than on bottom surfaces of the grooves, a second releasing layer is formed on the lamination film, a transfer layer is formed on the second releasing layer and a third electroforming layer is formed on the transfer layer, and then, the transfer layer and the third electroforming layer are peeled off from the second stamper to form a third stamper to which the patterns of lands and grooves of the second stamper is transferred. After that, the transfer layer on the third stamper is isotropically etched to reduce the width of the lands of the third stamper.

In the present invention, it is assumed that the track pitch of the patterns of lands and grooves is designed to be in the range of 50 to 100 nm. In this embodiment, the track pitch is designed to be in the range of 78 to 93 nm to produce a stamper.

Here, the lamination film is preferably formed by sputtering. A lamination film having a larger thickness on upper surfaces of the lands than on bottom surfaces of the grooves can be formed by controlling the pressure in the sputtering apparatus during sputtering. Likewise, the transfer layer is preferably formed by sputtering.

The electroforming layer is preferably formed of Ni or a metal obtained by adding Co, S, B or P to Ni. The lamination film and transfer layer are preferably formed of a metal containing Ni as its major component in consideration of physical and mechanical strength, resistance to corrosion and abrasion and adhesion to Ni contained in the electroforming layer.

The transfer layer on the third stamper is isotropically etched with an acid solution having a pH less than 3.

In the present invention, the following relations are to be established: (i) 10 nm$\leq EL_T$ and (ii) $E_T \leq TL_T$, where a width of the groove of the second stamper is $G_W$, a thickness of the lamination layer is $LL_T$, a thickness of the transfer layer is $TL_T$, a thickness of the third electroforming layer is $EL_T$, an etching thickness of the transfer layer is $E_T$ and a width of the land of the third stamper is $L_W$.

Accordingly, it is considered that the following relations are established: (iii) $2LL_T + 2TL_T + EL_T = G_W$ and (iv) $L_W = EL_T + 2(TL_T - E_T)$.

According to the present invention, since a lamination film, which reduces a width of grooves and has a larger thickness on upper surfaces of the lands than on bottom surfaces of the grooves, is formed on the second stamper, even if a height of the land of the master plate is small, a height of the land of the third stamper to be finally formed can be made larger. The fact that the height of the land of the master plate is allowed to be small makes it possible to reduce a thickness of the resist on the master plate. Therefore, even when high-density patterns are formed on the resist by EB lithography, good writing performance is provided.

Also, according to the present invention, the land could be made less rectangular when the width of the land of the third stamper is reduced by isotropically etching the transfer layer on the third stamper. Here, to be made less rectangular means that the corners of the lands are rounded. When a stamper with lands made less rectangular is used, it is easy to provide intimate imprinting of the stamper to the resist and to remove the stamper from the resist in the imprint process. For this reason, not only damages to the stamper and the transferred patterns are reduced but also the durability of the stamper is improved.

An embodiment of the present invention will be described with reference to the drawings.

FIGS. 1A to 1H are cross-sectional views showing a method of manufacturing a first stamper and a second stamper according to the embodiment of the present invention. In the production of these stampers, for example, a coater, an EB writing apparatus, a developing apparatus, a deposition apparatus and an electroforming apparatus are used.

As shown in FIG. 1A, a resist 12 is applied to a substrate 11 such as a glass or Si substrate by, for example, spin coating using a spin coater. As shown in FIG. 1B, latent images are formed on the resist 12 by, for example, electronic beam (EB) lithography using an EB writing apparatus 100. The resist 12 is developed using a developing apparatus to form patterns of lands and grooves. A master plate 10 is provided through the above steps.

As shown in FIG. 1C, a deposition apparatus is used to form a first conductive film 13 on the patterns of lands and grooves of the master plate 10. As shown in FIG. 1D, a first electroforming layer 14 made of Ni is formed on the first conductive film 13 by using an electroforming apparatus. As shown in FIG. 1E, the first conductive film 13 and the first electroforming layer 14 are peeled off from the master plate 10 to manufacture a first stamper (father stamper) 15 to which the lands and grooves of the master plate are transferred.

As shown in FIG. 1F, a first releasing layer 16 made of an oxide film is formed on the surface of the first stamper (father stamper) 15 by a method such as anodic oxidation or oxygen plasma asking. As shown in FIG. 1G, a second conductive layer 17 made of Ni is formed on the first releasing layer 16 and a second electroforming layer 18 is further formed. As shown in 1H, the second conductive layer 17 and the second electroforming layer 18 are peeled off to produce a second stamper (mother stamper) 19 to which the lands and grooves of the first stamper (father stamper) are transferred.

FIGS. 2A to 2E are cross-sectional views showing a method of manufacturing a third stamper according to the embodiment of the present invention.

As shown in FIG. 2A, a lamination film 20, which reduces a width of grooves and has a larger thickness on upper surfaces of the lands than on bottom surfaces of the grooves, is formed on the surface of the second stamper (mother stamper) 19. A stamper with patterns of lands and grooves having a track pitch of 83.2 nm is used as the mother stamper 19, and the lamination film 20 made of Ni is deposited thereon. Specifically, a DC sputtering apparatus is used under the conditions of a chamber pressure of 1.0 Pa, a discharge power of 100 W and a deposition time of 60 sec to form the lamination film 20 made of Ni. The thickness ($LL_T$) of the lamination film 20 was 5 nm on the sidewall of the groove having a width ($G_W$) of 35 nm, 5 nm on the bottom surface of the grooves and 10 nm on the upper surface of the land. Thus, the width of the grooves could be reduced by 10 nm and the height of the lands could be increased by 5 nm than those measured before the deposition.

This procedure is preferably carried out just after the second stamper (mother stamper) is peeled off from the first stamper (father stamper). This is because the surface of the first stamper is oxidized with time and there may be the case where the lamination film 20 cannot be stably formed.

Figure 2B:
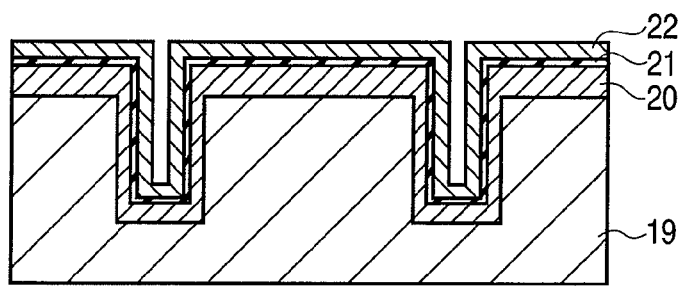

As shown in FIG. 2B, the surface of the lamination film 20 is subjected to RIE (Reactive Ion Etching) using oxygen to form a second releasing layer 21 made of an oxide film and then, a transfer layer 22 is deposited on the second releasing layer 21. Specifically, a DC sputtering apparatus is used under the conditions of a chamber pressure of 0.5 Pa, a discharge power of 100 W and a deposition time of 45 sec to form the transfer layer 22 made of Ni. The transfer layer 22 has a uniform thickness ($TL_T$) which is 5 nm on the sidewall of the grooves. Thus, the width of the grooves can be reduced by 10 nm than that measured before the deposition and the final width of the grooves is reduced to 15 nm.

Figure 2C:
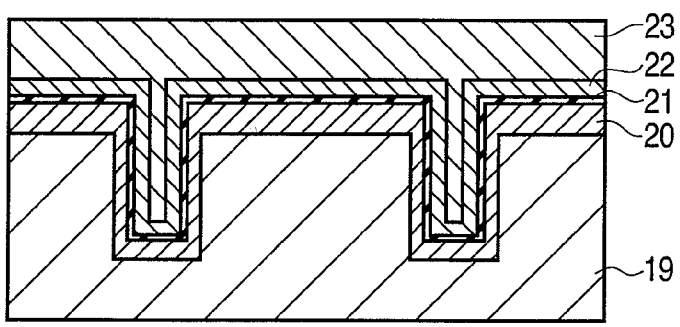

As shown in FIG. 2C, the lamination film is subjected to electroforming using a nickel sulfamate bath to form a third electroforming layer 23 which is made of Ni and has a width of $EL_T$.

Figure 2D:
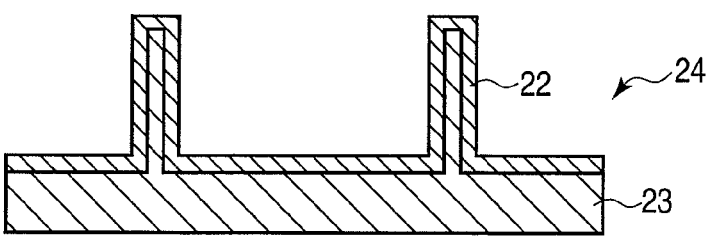

As shown in FIG. 2D, the transfer layer 22 and the third electroforming layer 23 are peeled off to manufacture a third stamper (son stamper) 24 to which the patterns of lands and grooves of the second stamper (mother stamper) are transferred.

Figure 2E:
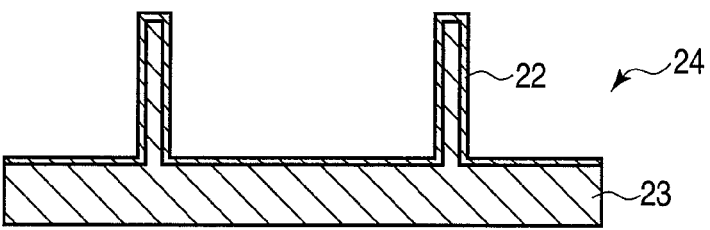

As shown in FIG. 2E, the transfer layer 22 on the surface of the third stamper (son stamper) 24 is etched isotropically. Specifically, the third stamper (son stamper) 24 is immersed in an aqueous sulfamic acid solution having a pH of 2.0 and is allowed to stand for 20 min. Because the etching rate is 0.1 nm/min, the etching thickness $E_T$ of the transfer layer 22 is 2 nm and the transfer layer 22 having a thickness of 3 nm is left. As a result, the width $L_T$ of the lands of the third stamper (son stamper) 24 is made 21 nm (=15 nm+2×3 nm). Thus, the width $L_T$ of the lands of the third stamper (son stamper) 24 can be reduced to 21 nm in contrast to the initial width $G_W$, 35 nm, of the grooves.

Figure 3:
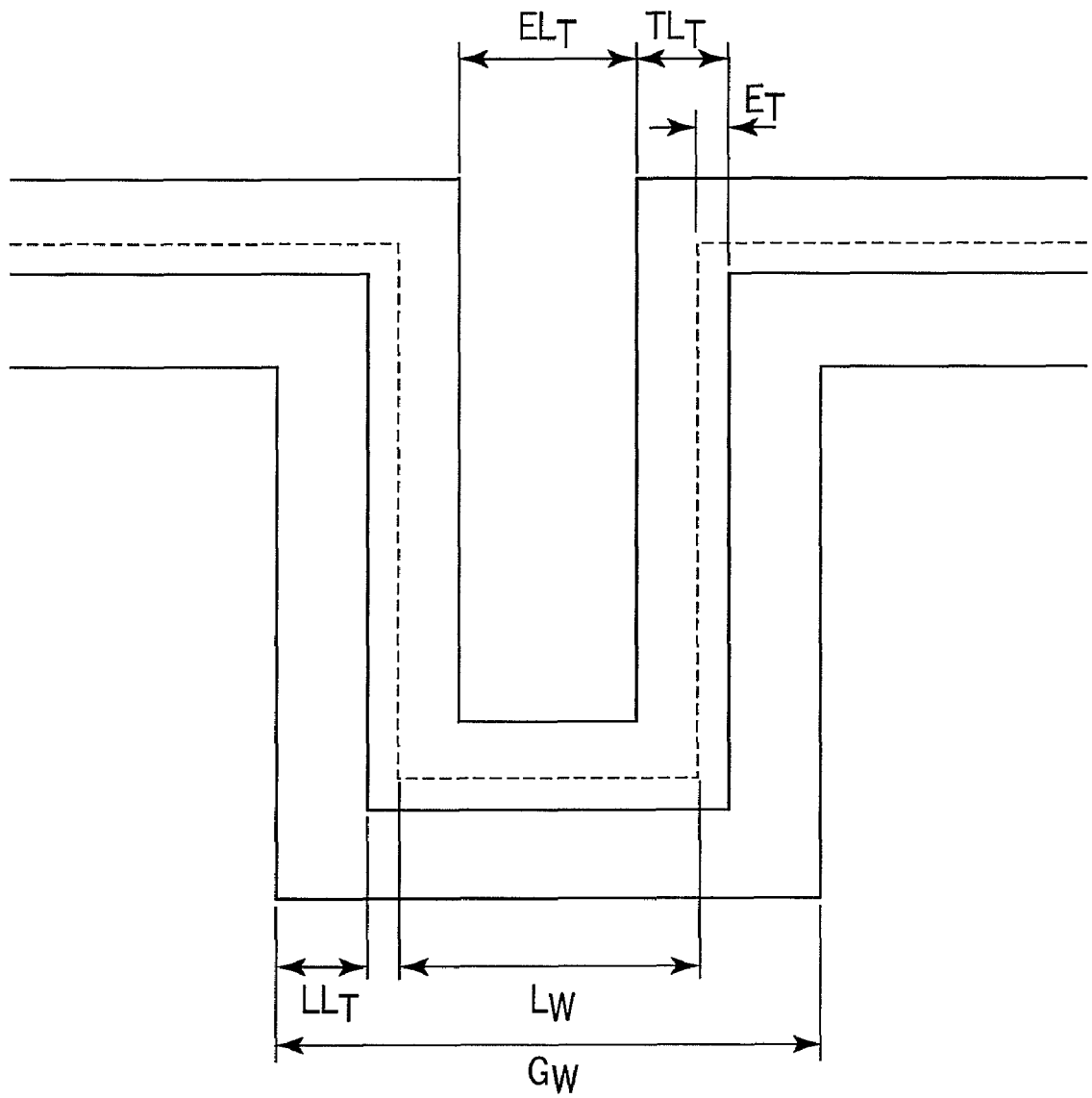
FIG. 3 is a diagram showing the thickness of each layer in an embodiment of the present invention.

FIG. 3 shows the thickness of each layer in the embodiment of the present invention. As described above, it is considered that the following relations are established: $2LL_T+2TL_T+EL_T=G_W$ and $L_W=EL_T+2(TL_T-E_T)$, where the width of the groove of the second stamper is $G_W$, the thickness of the lamination film is $LL_T$, the thickness of the transfer layer is $TL_T$, the thickness of the third electroforming layer is $EL_T$, the etching thickness of the transfer layer is $E_T$ and the width the land of the third stamper is $L_W$.

In the present invention, the following relations are to be established: (i) 10 nm$\leq EL_T$ and (ii) $E_T \leq TL_T$. The reason why these requirements are set is as follows.

The requirement (i) means that the thickness $EL_T$ of the third electroforming layer is 10 nm or more, that is, the width of the groove to be filled with the third electroforming layer is 10 nm or more. This is because if the width of the groove to be filled with the third electroforming layer is less than 10 nm, voids are produced when the groove is filled with the third electroforming layer, causing pattern defects. Thus, it is preferable that the requirement, 10 nm$\leq EL_T$, be satisfied to avoid these pattern defects.

The requirement (ii) means that the etching thickness $E_T$ of the transfer layer is equal to or less than the thickness $TL_T$ of the transfer layer. Although a transfer layer formed by sputtering contains Ni crystal grains having a relatively small size, the third electroforming layer formed by electroforming contains Ni crystal grains having a relatively large size. When the etching thickness $E_T$ of the transfer layer exceeds the thickness $TL_T$ of the transfer layer, Ni crystal grains having a large size in the third electroforming layer are etched, which causes great fluctuation in etching rate and there is a possibility to fail satisfactory etching. For this reason, the thickness $E_T$ of the transfer layer is preferably smaller than the thickness $TL_T$ of the transfer layer.

A protective film is applied to the patterns of lands and grooves of the third stamper (son stamper) by spin coating, followed by drying, and processed by, for example, back-grinding and punching as required to thereby complete a final stamper used to manufacture a large number of media through transfer by imprinting.

The configuration of lands and grooves of the stamper manufactured according to the method of the present invention is less rectangular than that of a stamper manufactured by a conventional method and therefore, the defects of the stamper generated during peeling are considerably reduced. As a result, the stamper of the present invention is improved in imprint durability five times higher than a conventional stamper.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A method of manufacturing a stamper, comprising:
   forming a first conductive layer on a master plate comprising lands and grooves;
   forming a first electroforming layer on the first conductive layer,
   peeling off the first conductive layer and the first electroforming layer from the master plate in order to form a first stamper to which the lands and grooves of the master plate are transferred;
   forming a first releasing layer on the first stamper;
   forming a second conductive layer on the first releasing layer,
   forming a second electroforming layer on the second conductive layer,
   peeling off the second conductive layer and the second electroforming layer from the first stamper in order to form a second stamper to which the lands and grooves of the first stamper are transferred;
   forming a lamination film on the second stamper, the lamination film being configured to reduce a width of grooves and comprising a larger thickness on upper surfaces of the lands than on bottom surfaces of the grooves;
   forming a second releasing layer on the lamination film;
   forming a transfer layer on the second releasing layer,
   forming a third electroforming layer on the transfer layer,
   peeling off the transfer layer and the third electroforming layer from the second stamper in order to form a third stamper to which the lands and grooves of the second stamper are transferred, and
   isotropically etching the transfer layer on the third stamper in order to reduce a width of lands of the third stamper,
   wherein the following relations are satisfied:
   10 nm $\leq EL_T$ and $E_T \leq TL_T$,
   where a width of the groove of the second stamper is $G_w$, a thickness of the lamination layer is $LL_T$, a thickness of the transfer layer is $TL_T$, a thickness of the third electroforming layer is $EL_T$, an etching thickness of the transfer layer is $E_T$ and a width of the land of the third stamper is $L_W$.

2. The method of claim 1, wherein the lamination film is formed by sputtering.

3. The method of claim 1, wherein the transfer layer on the third stamper is isotropically etched with an acid solution comprising a pH of less than 3.

4. The method of claim 1, wherein the following relations are satisfied:

$$2LL_T + 2TL_T + EL_T = G_W,$$

and $$L_W = EL_T + 2(TL_T - E_T).$$

5. The method of claim 1, wherein the lands and grooves has a track pitch in a range of 50 to 100 nm.

6. The method of claim 1, wherein the electroforming layer is formed of nickel (Ni) or a metal obtained by adding cobalt (Co), sulfur (S), boron (B) or phosphorus (P) to Ni.

* * * * *